(12) United States Patent
Shaffer et al.

(10) Patent No.: US 9,198,203 B2
(45) Date of Patent: Nov. 24, 2015

(54) SYSTEM AND METHOD FOR ROUTING CRITICAL COMMUNICATIONS

(75) Inventors: Shmuel Shaffer, Palo Alto, CA (US); Jean-Philippe Vasseur, Sain Martin d'Uriage (FR); Sandeep Jay Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 20 days.

(21) Appl. No.: 12/942,972

(22) Filed: Nov. 9, 2010

(65) Prior Publication Data
US 2012/0117268 A1 May 10, 2012

(51) Int. Cl.
*G06F 15/16* (2006.01)
*H04W 76/00* (2009.01)
*H04L 29/06* (2006.01)
*H04L 12/701* (2013.01)
*H04L 12/707* (2013.01)
*H04W 4/00* (2009.01)
*H04W 84/18* (2009.01)

(52) U.S. Cl.
CPC ............. *H04W 76/007* (2013.01); *H04L 29/06* (2013.01); *H04L 45/00* (2013.01); *H04L 45/24* (2013.01); *H04W 4/006* (2013.01); *H04W 84/18* (2013.01)

(58) Field of Classification Search
CPC ................................ H04L 45/00; H04L 29/06
USPC ......... 370/229–254, 345–355, 419–422, 455; 709/23–238
See application file for complete search history.

(56) References Cited

U.S. PATENT DOCUMENTS 5,978,364 A * 11/1999 Melnik .......................... 370/320
2002/0176370 A1 * 11/2002 Ohba et al. .................... 370/252

(Continued)

FOREIGN PATENT DOCUMENTS

JP 2007228064 * 9/2007
WO 02/28023 A2 4/2002
WO 2010/141727 A1 12/2010

OTHER PUBLICATIONS

Notification of Transmittal of International Search Report and Written Opinion of the International Search Authority, or the Declaration, mailed Feb. 13, 2012 in International Application No. PCT/US2011/059853, 14 pages.

(Continued)

*Primary Examiner* — Chris Parry
*Assistant Examiner* — Weiwei Stiltner
(74) *Attorney, Agent, or Firm* — Parker Ibrahim & Berg LLC; James M. Behmke; Stephen D. LeBarron

(57) ABSTRACT

According to one or more implementations of the disclosure, packets may be transmitted in a low power and lossy network (LLN) by receiving, on a first node, a message from a sending node, and by activating a critical message configuration to be applied in routing the message. A message identifier (e.g., signature) for the message may also be received or gleaned. The message identifier can be compared at the first node to a list of stored message identifiers, created based on routing history, to determine if the message has already been received. As such, if the message has not been received at the first node previously, a first parent and a second parent for the message are identified and the message, along with the critical message indication, can be transmitted to the first parent and the second parent, thereby achieving redundancy in the routing of the message.

16 Claims, 7 Drawing Sheets

(56) References Cited

U.S. PATENT DOCUMENTS

| | | | |
|---|---|---|---|
| 2006/0007852 A1* | 1/2006 | Brueckner et al. | 370/216 |
| 2006/0120433 A1* | 6/2006 | Baker et al. | 375/130 |
| 2007/0097858 A1* | 5/2007 | Lesartre et al. | 370/228 |
| 2007/0162614 A1* | 7/2007 | Patel et al. | 709/239 |
| 2009/0185547 A1* | 7/2009 | Budampati | 370/345 |
| 2010/0111273 A1* | 5/2010 | Strommer | 379/114.05 |
| 2010/0123572 A1 | 5/2010 | Thubert et al. | |
| 2010/0223347 A1* | 9/2010 | Van Datta | 709/206 |
| 2010/0284352 A1* | 11/2010 | Lee et al. | 370/329 |
| 2010/0299354 A1* | 11/2010 | Nagoya | 707/769 |
| 2011/0249630 A1* | 10/2011 | Kim et al. | 370/329 |
| 2012/0008542 A1* | 1/2012 | Koleszar et al. | 370/312 |

OTHER PUBLICATIONS

Tsai, et al., "A Forwarding Mechanism for Processing Two Categories of Packets in Wireless Sensor Networks,", 2010 International Symposium on Computer, Communication, Control and Automation, May 5, 2010, 4 pages.

Offiical Action issued May 21, 2015 in connection with Chinese Application No. 201180053834.8.

* cited by examiner

SYSTEM AND METHOD FOR ROUTING CRITICAL COMMUNICATIONS

TECHNICAL FIELD

The present disclosure generally relates to computer networks, and, more particularly, to the routing and management of alert messages, e.g., for Low power and Lossy Networks (LLNs).

BACKGROUND

Low power and Lossy Networks (LLNs), e.g., sensor networks, can have myriad applications, such as Smart Grid and Smart Cities. LLNs can be implemented to take into account various design issues, such as lossy links, low bandwidth, battery operation, low memory and/or processing capability, etc.

DESCRIPTION OF EXAMPLE IMPLEMENTATIONS

Overview

Figure 1:
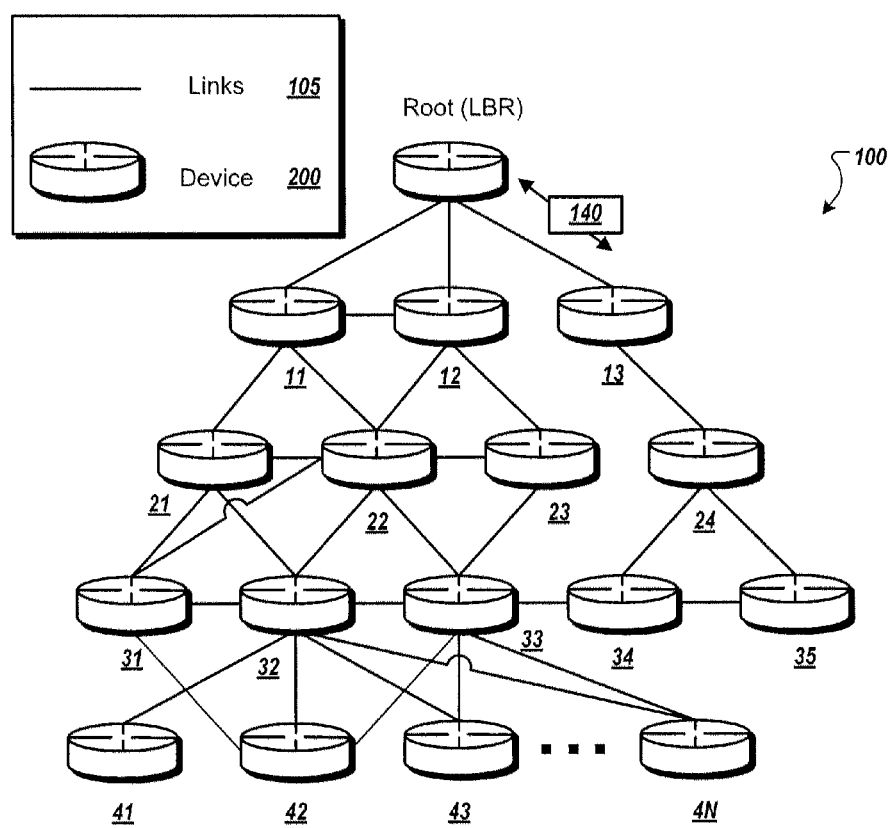
FIG. 1 illustrates a block diagram of an example of a computer network.

According to one or more implementations of the disclosure, packets may be transmitted in a low power and lossy network (LLN) by receiving, on a first node, a message from a sending node, and by activating a critical message configuration to be applied in routing the message. A critical message notification can be activated in response to detecting the critical message indication. A message identifier (e.g., signature) for the message may also be received. The message identifier can be compared at the first node to a list of stored message identifiers, created based on routing history, to determine if the message has already been received. As such, if the message has not been received at the first node previously, a first parent and a second parent for the message are identified and the message, along with the critical message indication, can be transmitted to the first parent and the second parent, thereby achieving redundancy in the routing of the message to improve reliability of the message delivery and speed.

DESCRIPTION

One routing solution for LLNs is a protocol called Routing Protocol for LLNs or "RPL," which is a distance vector routing protocol that builds a Destination Oriented Directed Acyclic Graph (DODAG) in addition to a set of features to bound the control traffic, support local (and slow) repair, etc. The RPL architecture provides a flexible method by which each node performs DODAG discovery, construction, and maintenance.

Implementations of LLNs can also be designed to account for effective transport of critical or other high priority messages. In some cases, a degree of loss may be assumed for messages ordinarily traversing a network, and for non-critical messages, this may be acceptable (e.g., losing one sensor reading out of ten or one hundred for a slowly changing measurement may not be problematic). In the case of critical messages, the message may only be generated once, and it may be otherwise important to ensure delivery to an intended destination in a reliable and timely manner. Note that this delivery of critical messages may be performed, in addition to supplemental measures performed, by higher level message delivery protocols that rely on acknowledgement replies sent from a source to a destination. Such operations may require action by a substantial portion of the DAG. In some aspects, a DAG may refer to a directed graph having a property, for example, that all edges are oriented in such a way that no cycles (e.g., loops) exist. All edges may be contained in paths oriented toward and terminating at one or more root nodes (e.g., "clusterheads or "sinks"), often to interconnect the devices of the DAG with a larger infrastructure, such as the Internet, a wide area network, or some other domain. A Destination Oriented DAG (DODAG) may be considered as a DAG rooted at a single destination, e.g., at a single DAG root. A "parent" of a particular node within a DAG may refer to an immediate successor of a particular node on a path towards the DAG root, such that the parent can have a lower "rank" than the particular node itself, where the rank of a node can identify the node's position with respect to a DAG root (e.g., the farther away a node is from a root, the higher is the rank of that node). Further, a sibling of a node within a DAG may refer to any neighboring node that is located at the same rank within a DAG. Siblings may not necessarily share a common parent, and routes between siblings generally may not be part of the DAG because there is no forward progress (e.g., their rank is the same). A tree may refer to a kind of DAG, where each device/node in the DAG can have one parent node or, as used herein, one preferred parent node. In some configurations, a substantial portion of the DAG may represent a multiple of two or three times the number of nodes in the path between a source and a destination.

In addition, some of these actions in certain networks, such as those meant to carry sensitive traffic (e.g., alarms), may require frequent global operations. With large DAGs, implementations for the reliable transmission of critical alerts or other such operations can take into account scaling issues and management costs (e.g., memory, processing, battery life, etc.). Also, redundancy of transmission through one or more nodes may be purposefully avoided to further enhance reliability, for the subset of critical messages or all messages.

In some aspects, a computer network can be described a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs may typically connect the nodes over dedicated private communications links located in a same general physical location, such as a building or campus. WANs, on the other hand, may typically connect geographically dispersed nodes over long-distance communications links, such as common carrier telephone lines, optical light paths, synchronous optical networks (SONET), synchronous digital hierarchy (SDH) links, or Powerline Communications (PLC) such as IEEE 61334, CPL G3, and WPC among others. In addition, a Mobile Ad-Hoc Network (MANET) may be a kind of wireless ad-hoc network, which can be generally considered a self-configuring network of mobile routes (and associated hosts) connected by wireless links, the union of which forms an arbitrary topology.

Smart object networks, such as sensor networks, in particular, can be a specific type of network having spatially distributed autonomous devices, such as sensors that cooperatively monitor physical or environmental conditions (e.g., temperature, pressure, vibration, sound, radiation, motion, pollutants, etc.) at different locations. Other types of smart objects may include actuators, e.g., actuators responsible for turning on/off an engine or perform any other actions. Sensor networks may include wireless networks, though wired connections also may be available. That is, in addition to one or more sensors, each sensor device (node) in a sensor network may generally be equipped with a radio transceiver or some other communication port, a microcontroller, and an energy source, such as a battery. Generally, size and cost constraints on sensor nodes may result in corresponding constraints on resources, such as energy, memory, computational speed and bandwidth. Correspondingly, a reactive routing protocol may, though need not, be used in place of a proactive routing protocol for sensor networks.

In certain configurations, the sensors in a sensor network can transmit their data to one or more centralized or distributed database management nodes that obtain the data for use with one or more associated applications. Alternatively (or in addition), certain sensor networks can provide for mechanisms by which an interested subscriber (e.g., a "sink") may specifically request data from devices in the network. In a "push mode," the sensors can transmit their data to the sensor sink/subscriber without prompting, e.g., at a regular interval/frequency or in response to external triggers. Conversely, in a "pull mode," the sensor sink may specifically request that the sensors (e.g., specific sensors or all sensors) transmit their current data (or take a measurement, and transmit that result) to the sensor sink.

FIG. 1 shows a schematic block diagram of an example of a computer network 100 having nodes/devices 200 (e.g., routers, sensors, computers, etc., such as LLN border routers (LBRs), nodes 11, 12, . . . 46) that are interconnected by various methods of communication illustrated as links (e.g., link 105). The links represent wired and/or wireless communication mediums through which certain other nodes 200 may be in communication with other nodes 200, e.g., depending on distance, signal strength, current operational status, location, etc. The implementation shown in FIG. 1 is not limited to the number of nodes, devices, and/or links shown and the implementation may generally have any number of nodes, devices, links, etc. used in the computer network.

The network 100 can be a low power and lossy network (LLN), such as a wireless mesh network. Illustratively, certain nodes 200 in the network 100 may have more capabilities or functionality than others, such as those devices having larger memories, sustainable non-battery power supplies, etc., versus those devices having minimal memory, battery power, etc. For instance, certain nodes 200 may have no or limited memory capability. Also, one or more of the nodes 200 may be considered "root nodes/devices" (or root capable devices), while one or more of the other nodes 200 may also be considered "destination nodes/devices." As shown in FIG. 1, the root node includes the node labeled "Root/LBR". The label "destination node" may vary with a communications flow. For example, in an exchange between nodes 35 and 41, the node 35 may be a source of the communications flow and node 41 may be the destination.

Data packets 140 (e.g., traffic and/or messages sent between the devices/nodes) may be exchanged among the nodes/devices of the computer network 100 using predefined network communication protocols, such as a Transmission Control Protocol/Internet Protocol (TCP/IP), a User Datagram Protocol (UDP), Multi-Protocol Label Switching (MPLS), or other various proprietary protocols, etc. In this context, for example, a protocol may include a set of rules defining how the nodes interact with each other. In addition, packets within the network 100 may be transmitted in a different manner depending upon device capabilities, such as source-routed packets.

Network 100 shows a hierarchy of devices at varying depths. For example, nodes 11, 12, and 13 have a depth of 1. Nodes 21-24 have a depth of 2, and nodes 31-35 have a depth of 3. Nodes 41-4N have a depth of 4. Generally, the greater the depth, the less complex the routing table. Changes closer to the Root (LBR) have a greater impact that changes that impact nodes a greater depth.

Figure 2A:
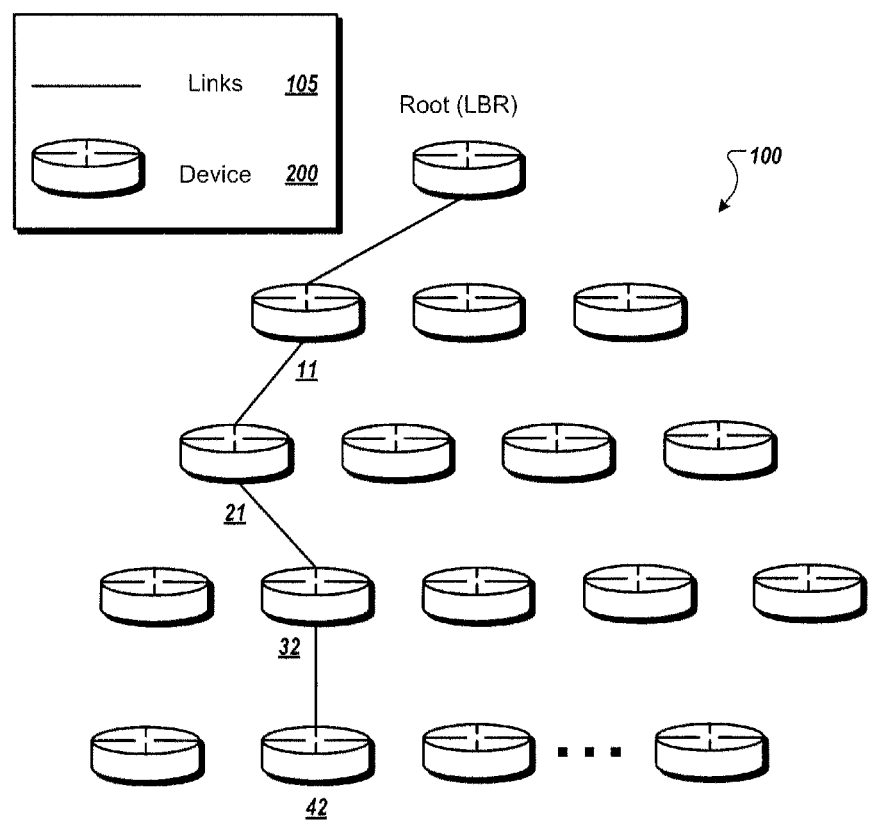
FIGS. 2A-2C illustrate block diagrams of an example of a computer network, including examples of message paths among nodes in the network.
Figure 2B:
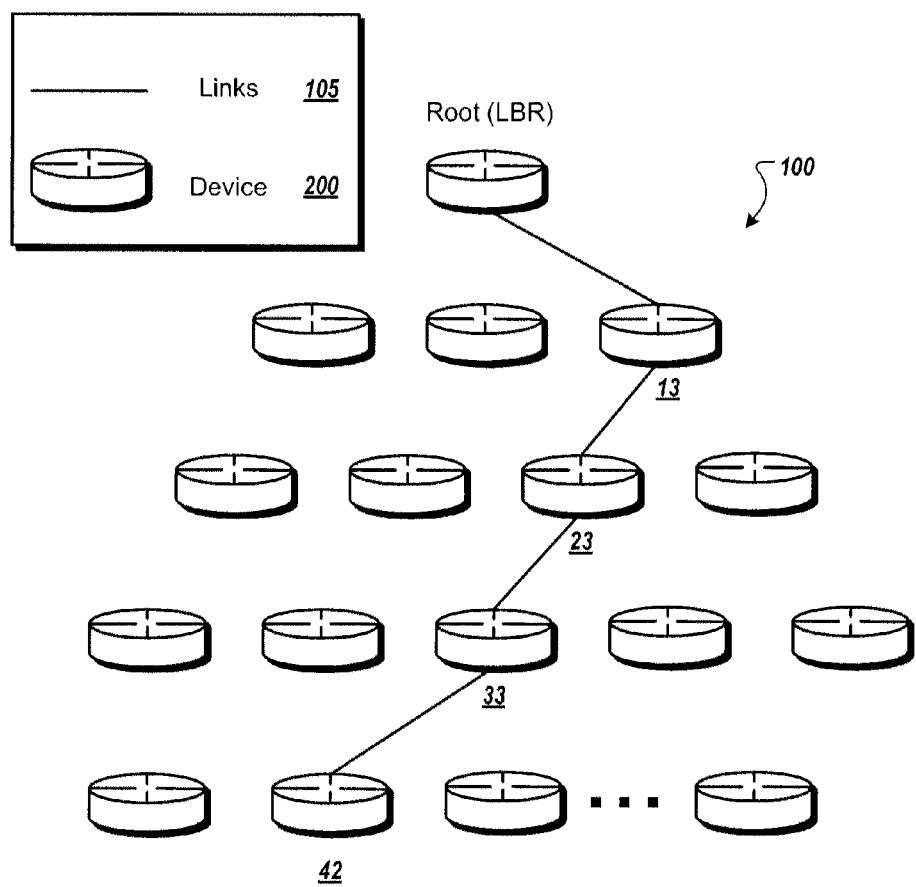
Figure 2C:
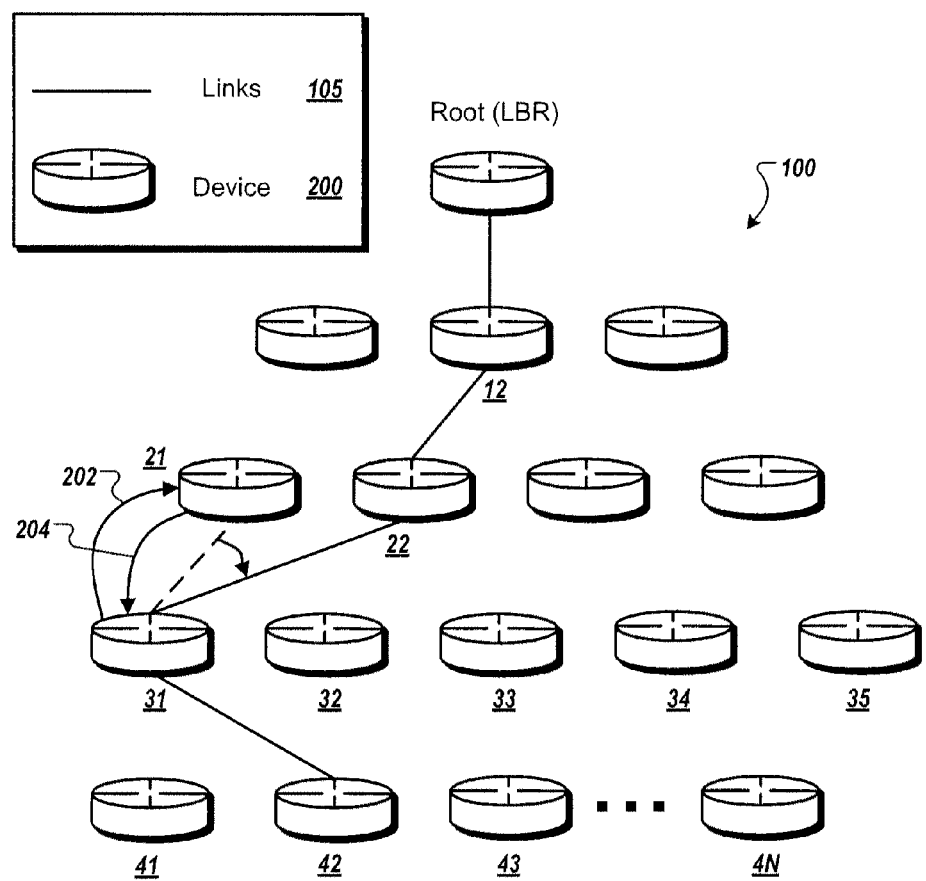

FIGS. 2A-2C show schematic block diagrams of the exemplary computer network 100, including examples of message paths among nodes in the network, extending from node 42 to the Root (LBR). These paths account for a message at node 42 that is targeted for delivery to the LBR node through the network 100. The network 100 supports a critical message notification to ensure that mission-critical messages are communicated to their destination in a timely and reliable manner. In such a network, for example, some messages may be lost or dropped as they traverse via the network (e.g., the network is assumed to be lossy), but other messages are distinctly treated to reduce, minimize, or eliminate such loss.

In some implementations, LLN's may rely on the end-to-end acknowledgement. If the originating node does not receive an acknowledgement in a timely manner then it retransmits the original message. While this method may be sufficient for "normal" messages, it may not be sufficient (or even employed) for high priority messages that are expected to arrive within a short window of time (e.g., alerts, alarms).

In the examples illustrated by FIGS. 2A-2C, the message is duplicated as it traverses the network 100 to ensure a timely delivery of the message to its designated target. Since in some implementations, for example, LLN's may have limited bandwidth, and the message may not be generally broadcasted. Rather the message may be propagated towards its designated target, and when a link or the next node on the path is determined to be temporarily unavailable, the node that received the message can identify an alternate path and can attempt to re-send the message via the alternate path.

Referring now to FIG. 2A, a high priority message is generated at the node 42 and is passed along a first path to the root node LBR. The node 42 transmits the message to its parent node 32, which in turn passes the message to its parent node 21. The node 21 passes the message to its parent node 11, which in turn passes the message to the root node LBR.

Referring now to FIG. 2B, the high priority message is sent from the node 42 to the root node LBR through a second path that is different from the first path used in the example of FIG. 2A. In FIG. 2B, the node 42 transmits the message to a parent node other than the node 32. The message is sent to the node 33, which relays the message on to its parent node 23. The message is then passed on to the node 13 and finally on to the root node LBR.

Referring now to FIG. 2C, the high priority message is sent from the node 42 to the root node along a third path. The message is transmitted from the node 42 to its parent node 31. In turn, the parent node 31 attempts to send the message to its parent node 21, as illustrated by the transmission 202. However, as illustrated in FIG. 2A, the node 21 has already passed a copy of the message as part of the first path (or node 21 may already be designated as a component part of a path established or reserved for future transmission of the message).

A node that receives a mission critical message with a critical message indication activates a critical message notification to route the mission critical message to ensure delivery of the message. For example, a message identifier for the message can be accessed so that the node can check an internal store to see if the message has already been received. If the message has already been forwarded, then the node sends a negative acknowledgement message back to the sending (previous) node to indicate that this path has already been explored. In some implementations, the negative acknowledgement message can include a flag to indicate the reason for the message.

The negative acknowledgement message triggers further processing by the sending node to determine an alternative target node to which the message is to be routed (e.g., one whose internal store does not indicate that the message has been previously received). In essence, the sending node attempts to find a new path which has not yet been utilized. If the message has not yet been received by the target node, then the target node identifies at least two parent nodes to which the message should be sent. The target node then sends the message with the critical message indication to the parents. If, however, the target node receives a negative acknowledgement message in reply, the node can identify an additional parent node and send the message to the newly-identified additional parent node.

Referring again to FIG. 2C, the node 21 receives the high priority message (e.g., as the transmission 202) from the node 31. Upon receipt of the message, the node 21 checks its internal store to determine if another message with the same message identifier has already been received at the node 21. In the present example, the message has already passed through the node 21 along the first path. The node transmits a negative acknowledgement message 204 back to the node 31 to notify the node 31 that the node 21 had already been utilized for passing the message. Alternatively, the path could be tested in advance of message delivery to save time and bandwidth. For example, the internal memory of a node may include an indication that another (potentially) highly-reliable path exists. The node could then use the highly-reliable path in order to ensure delivery of the network.

In response to receiving the negative acknowledgement message 204, the node 31 selects a new parent node 22 and re-transmits the message to the parent node 22. In some implementations, the path can traverse a node which has been previously identified as a sibling or neighbor (e.g., a node with a same distance from the root node of the DAG, the nodes 32-35). In some implementations, if all of the parent and sibling nodes have been exhausted and the sending node (but not necessarily the originating node) does not receive a negative acknowledgement message (e.g., the negative acknowledgement message 204), the sending node may attempt to use one of its child nodes as a means for propagating the message towards its destination (e.g., the node 31 may utilize one of its child nodes 41, 43, or 4N).

In some implementations, the same process may be used to determine whether a path with multiple upstream nodes within a DAG has previously routed a message (e.g., to identify a path devoid of nodes that have previously routed the message), and thus achieve substantially non-redundant routing of the message, in which duplicated messages are routed via diverse paths in the network thus increasing the chances that at least one of the copy of the critical message reaches its destination. In the present example, the third path is completed when the message is passed from the node 22 to node 12, and on to the root node.

Figure 3:
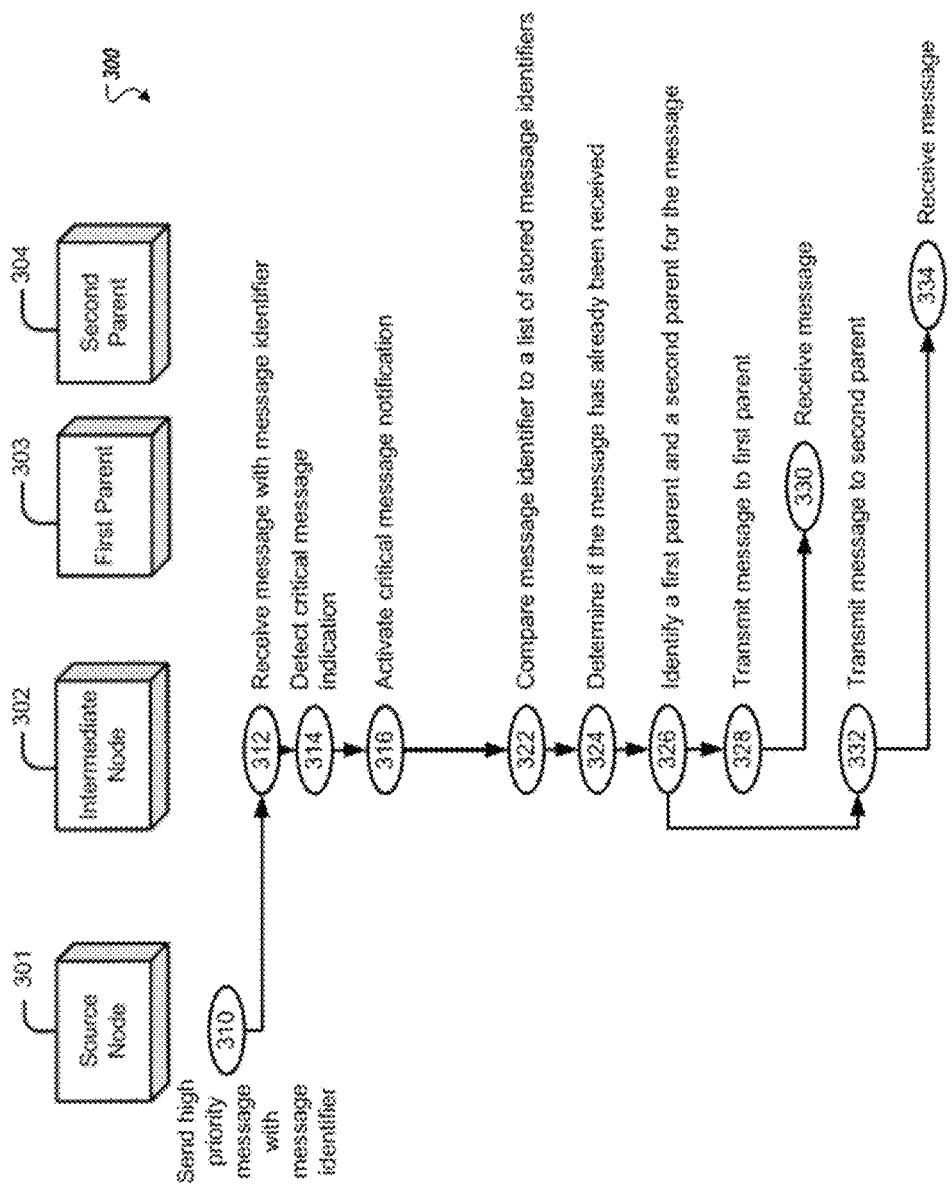
FIG. 3 is a timeline diagram illustrating examples for communications among the nodes in the network.

FIG. 3 illustrates examples of communications and processes 300 taken by nodes in a network, such as the network 100. Specifically, FIG. 3 illustrates how an intermediate node 302 receives a message and relays it on to parent nodes (e.g., first parent 303 and second parent 304) depending upon whether the node 302 has already passed the message. In some implementations, the node 302 can be one of the nodes of FIG. 2C, such as the node 31. In some examples, the actions taken by the node 302 can ensure that mission critical messages are sent along a path toward their destinations by diversifying the paths the messages have taken, while at the same time preventing excessive messaging from consuming an inordinate amount of network bandwidth and node power.

Initially, a source node 301 (e.g., the node 42) sends a message (e.g., the message 202) and a message identifier to the intermediate node 302 in step 310. For example, the source node 301 may sense a power outage, an equipment failure, physical or cyber-attack, or other appropriate condition of sufficient importance as to warrant the transmission of a notification to a root or other destination node. The message from the source node 301 is received by the intermediate node 302 with the message identifier in step 312. Likewise, the intermediate node 302 also accesses a critical message indication for the message in step 314. The message identifier may include information from which an identifier may be derived. Note that a critical message indication may be present as part of the message 302 itself in one of its fields rather than as a separate message. Thus, intermediate node 302 detects that the received message, it thereby receives an alarm/urgent message.

In response to detecting the critical message indication for the message, the intermediate node 302 activates a critical message notification in step 316. In some implementations, the critical message notification may cause the intermediate node to route "critical" messages differently than the routing configuration used for non-urgent messages. For example, a "normal" message may be a single sensor reading out of a stream of such messages, and as such, the loss of a single or a small number of such messages may not have a significant impact on the utility of the sensor. By contrast, "critical" messages may occur only rarely and momentarily, and as such, additional steps may be taken to route the messages with greater reliability than their "normal" counterparts.

In some implementations, activating a critical message notification in response to detecting the critical message indication for the message may include invoking a filter to reduce an amount of traffic that the node sends. Conversely, this activation may include using the critical message configuration to transmit packets associated with the critical message condition while filtering non-urgent messages.

The intermediate node 302 compares the message identifier, at step 322, to a list of stored message identifiers. In some implementations, the intermediate node 302 may store the message identifier in response to determining that the message has not already been received. For example, the intermediate node 302 may temporarily store a list of identifiers for messages that it has recently received for a predetermined period of time. In another example, the intermediate node 302 may buffer a predetermined number of received identifiers in a rolling buffer in which a newly received message identifier overwrites the oldest identifier in the buffer.

At step 324, the intermediate node determines if the message has already been received (e.g., by comparing the identifier to the stored identifiers). In some implementations, if the intermediate node 302 determines (324) that the message has already been received, then a negative acknowledgement message along with the received packet or with the packet ID may be transmitted back to the source node 301. For example, the node 31 sends the message 202 to the node 21, which in the example of FIG. 2C determines that the message 202 has already traversed the node 21, and respond by sending the negative acknowledgement message 204 and the original packet or the packet ID to the node 31.

In response, the source node 301 may identify an alternative intermediate node and send the message to that node. For example, in response to receiving the negative acknowledgement message 204, the node 31 identifies the node 22 and resends the message to it. In the present example, the intermediate node 302 has determined (324) that the message has not been received previously, and at step 326, in response to activating the critical message notification and also in response to determining that the message has not already been received, the intermediate node 302 identifies a first parent node 303 and a second parent node 304 for the message. In some implementations, to improve the chances of the message reaching its destination, the intermediate node 302 may identify two or more nodes that are relatively closer to the destination node than the intermediate node 302 in order to increase the path diversity of the message. As such, even if one of the identified parents (or a path beyond it) is unable to ultimately reach the destination node, another of the identified parent nodes may still be part of a usable path. In one configuration, if the intermediate node 302 cannot identify proper parent nodes (closer to the root of the DAG root), the intermediate node 302 attempts to propagate the message uplink (towards the DAG root) via one of its sibling nodes or even via one of its child nodes.

At step 328, the intermediate node 302 transmits the message to the first parent node 303, and the message is received at the first parent node in step 330. Similarly, at step 332, the intermediate node 302 transmits the message to the second parent node 304, and the message is received at the second parent node in step 334. In some implementations, in response to receiving a negative acknowledgement message from the first parent node 303 indicating that the first parent node 303 has already received the message, the intermediate node 302 may identify and transmit the message to a third parent node. For example, the intermediate node 302 may be aware of all of the nodes with which it is able to communicate (e.g., parent nodes, sibling nodes, child nodes), and relay the message via some or all of those nodes.

Although process 300 is shown as an operation that is performed with multiple operations, the operations may be performed sending a message to the intermediate node, having the intermediate message parse an alarm/priority condition from the message, and thereafter instigating comparison of the received message (or its attributes) with a log of received messages.

In some configurations, the message identifier includes a sequence number of messages that have been sent. In another configuration, the message identifier is implied based on characteristics in the message body, subject, or a checksum.

Figure 4:
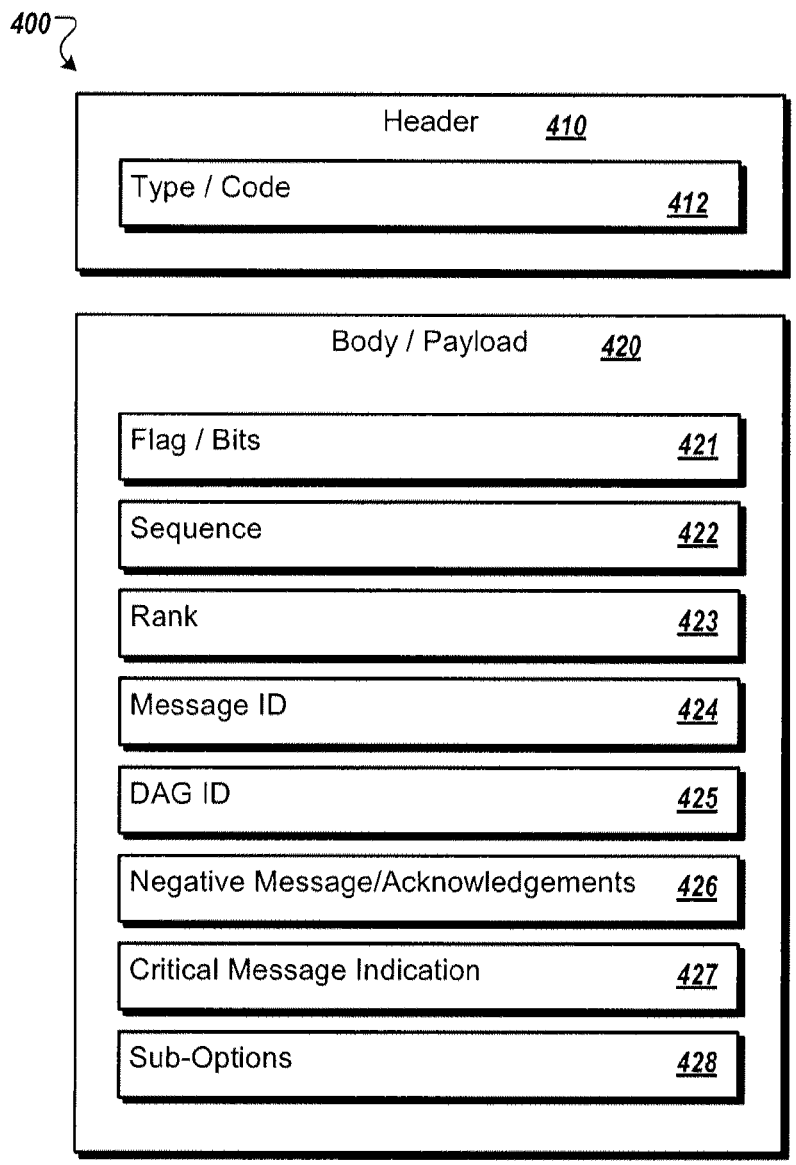
FIG. 4 illustrates an example of a message format.

FIG. 4 illustrates an example for a simplified message format 400 that may be used for communicating a critical alert or some other high priority message across the DAG. Message 400 includes a header 410 within one or more fields 412 that identify the type of message (e.g., a RPL control message), and a specific code indicating the specific type of message. Within the body/payload 420 of the message may be a number of fields used to relay the pertinent information. In particular, the fields may include various flags/bits 421, a sequence number 422, a rank value 423, a message ID 424, a DAG ID 425, and other fields. Further, for high priority messages, additional field for negative acknowledgement messages 326 and a critical message indication field 427 may also be included, among others. One or more additional sub-option fields 428 may be used to supply additional or custom information within the message 400.

Figure 5:
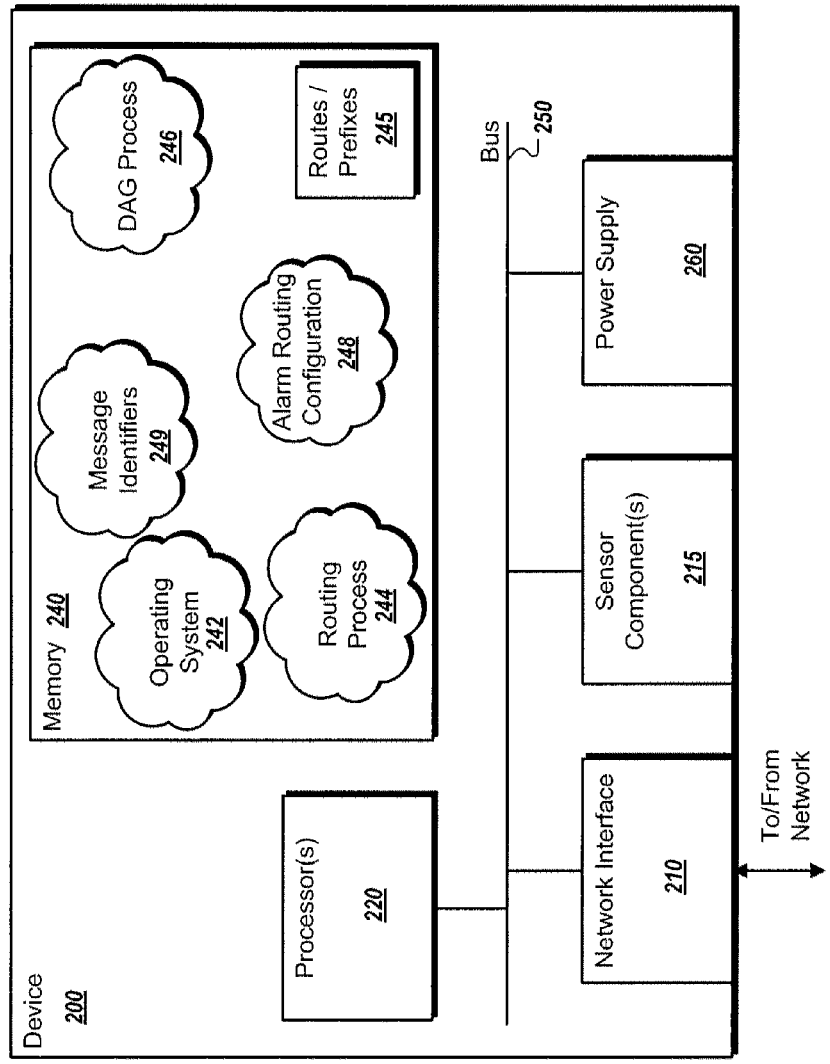
FIG. 5 is a schematic block diagram with an example of a node that may be used with one or more implementations described herein.

FIG. 5 is a schematic block diagram of an example of a node/device 200 that may be used with one or more implementations described herein, e.g., as a root node or sensor. The device may include one or more network interfaces 210, one or more sensor components 215 (e.g., sensors, actuators, etc.), a processor 220 (e.g., an 8-64 bit microcontroller), and a memory 240 interconnected by a system bus 250, as well as a power supply 260 (e.g., battery, plug-in, etc.). The network interface(s) 210 contain the mechanical, electrical, and signaling circuitry for communicating data over physical and/or wireless links coupled to the network 100. The network interfaces 210 may be configured to transmit and/or receive data using a variety of different communication protocols, including, inter alia, TCP/IP, UDP, wireless protocols (e.g., IEEE Std. 802.15.4, WiFi, Bluetooth®), Ethernet, Power Line Communication (PLC) protocols, etc.

The memory 240 can include any number of storage locations that are addressable by the processor(s) 220 and the network interfaces 210 for storing software programs and data structures associated with the implementations described herein. As noted above, certain devices may have limited memory or no memory (e.g., no memory for storage other than for programs/processes operating on the device). The processors 220 may include some elements or logic configured to execute the software programs and manipulate the data structures, such as routes or prefixes 245 (notably on capable devices only). An operating system 242, portions of which are typically resident in memory 240 and executed by the processor(s) 220, functionally organizes the device by, inter alia, invoking operations in support of software processes and/or services executing on the device. These software processes and/or services may include routing process/services 244, which may include a DAG process 246. Also, a critical message notification process 248 and a stored list of message identifiers 249 for messages previously received by the node 200 may also be present in memory 240, for use as described herein. The systems, methods and components described herein are not limited to the implementations shown, but other processor and memory types, including various computer-readable media, may be used to store and execute program instructions pertaining to the techniques described herein. Also, while the description illustrates various processes, these and other various processes may be embodied as modules configured to operate in accordance with the techniques herein (e.g., according to the functionality of a similar process).

Routing process (services) 244 includes computer executable instructions executed by the processor(s) 220 to perform functions provided by one or more routing protocols or configurations, such as the critical message notification 248, or proactive or reactive routing protocols. These functions may, on devices capable of such functionality, be configured to manage a routing/forwarding table 245 containing data, e.g., data used to make routing/forwarding decisions. For instance, in proactive routing, connectivity is discovered and known prior to computing routes to any destination in the network, e.g., link state routing such as Open Shortest Path First (OSPF), Intermediate-System-to-Intermediate-System (ISIS), or Optimized Link State Routing (OLSR). Reactive routing, on the other hand, discovers neighbors (e.g., does not have an a priori knowledge of network topology), and in response to a needed route to a destination, sends a route request into the network to determine which neighboring node may be used to reach the desired destination. Examples reactive routing protocols may include Ad-hoc On-demand Distance Vector (AODV), Dynamic Source Routing (DSR), DYnamic MANET On-demand Routing (DYMO), etc. Notably, on devices not capable or configured to store routing entries, the routing process 244 may only involve providing required mechanisms for source routing techniques. That is, for source routing, other devices in the network can tell the less capable devices exactly where the less capable devices should send the packets, and the less capable devices can simply forward the packets as directed.

Low power and Lossy Networks (LLNs), e.g., certain sensor networks, may be used in a myriad of applications such as for "Smart Grid" and "Smart Cities." A number of design considerations in LLNs can be taken into account, such as:

1) Links generally may be lossy, such that a Packet Delivery Rate/Ratio (PDR) can vary due to various sources of interferences;

2) Links generally can have a low bandwidth, such that a control plane traffic generally may be bounded and deemed negligible compared to the low rate data traffic;

3) There are a number of use cases that may have a requirement for specifying a set of link and node metrics, some of them being dynamic, thus requiring specific smoothing functions to avoid routing instability;

4) Constraint-routing may be required by some applications;

5) Scale of the networks may become very large, e.g., on the order of several thousands to millions of nodes; and/or 6) Nodes may be constrained with a low memory, a reduced processing capability, a low power supply (e.g., battery).

In other words, LLNs may be considered as a class of network in which both the routers and their interconnects are constrained: LLN routers typically operate with constraints. LLNs may involve anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-14> by Winter, at al. (Oct. 25, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

DAGs may generally be built based on an Objective Function (OF). The role of the Objective Function is generally to specify rules on how to build the DAG (e.g. number of parents, backup parents, etc.). In addition, one or more metrics/constraints may be advertised by the routing protocol to optimize the DAG against. Also, the routing protocol allows for including an optional set of constraints to compute a constrained path, such as, where if a link or a node does not satisfy a required constraint, the link is "pruned" from the candidate list when computing the best path. Alternatively, the constraints and metrics may be separated from the OF. Additionally, OFs may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, policies, etc., of an OF are considered "DAG parameters."

Illustratively, examples of metrics used to select paths (e.g., preferred parents) may include cost, delay, latency, bandwidth, estimated transmission count (ETX), etc., while examples of constraints that may be placed on the route selection may include various reliability thresholds, restrictions on battery operation, multipath diversity, load balancing requirements, bandwidth requirements, transmission types (e.g., wired, wireless, etc.), and also a number of selected parents (e.g., single parent trees or multi-parent DAGs). An example for how routing metrics may be obtained may be found in an IETF Internet Draft, entitled "Routing Metrics used for Path Calculation in Low Power and Lossy Networks" <draft-ietf-roll-routing-metrics-11> by Vasseur, et al. (Oct. 23, 2010 version). Further, an example OF (e.g., a default OF) may be found in an IETF Internet Draft, entitled "RPL Objective Function 0" <draft-ietf-roll-of0-03> by Thubert (Jul. 29, 2010 version).

Building a DAG may utilize a discovery mechanism to build a logical representation of the network, and route dissemination to establish a state within the network so that routers know how to forward packets toward their ultimate destination. In some aspects a "router" may refer to a device that can forward as well as generate traffic, while a "host" may refer to a device that can generate but does not forward traffic. Also, a "leaf" may be used to generally describe a non-router that is connected to the DAG by one or more routers, but cannot itself forward traffic received on the DAG to another router on the DAG. Control messages may be transmitted among the devices within the network for discovery and route dissemination when building the DAG.

According to the illustrative RPL protocol, a DODAG Information Object (DIO) can be a type of DAG discovery message that carries information that allows a node to discover a RPL Instance, learn its configuration parameters, select a DODAG parent set, and maintain the upward routing topology. In addition, a Destination Advertisement Object (DAO) may refer to a type of DAG discovery reply message that conveys destination information upwards along the DODAG so that a DODAG root (and other intermediate nodes) can provision downward routes. A DAO message can include prefix information to identify destinations, a capability to record routes in support of source routing, and information to determine a freshness of a particular advertisement. In some implementations, "upward" or "up" paths may refer to routes that lead in the direction from leaf nodes towards DAG roots, e.g., following the orientation of the edges within the DAG. Conversely, "downward" or "down" paths may refer to routes that lead in a direction from the DAG roots towards the leaf nodes, e.g., generally going against the orientation of the edges within the DAG.

Generally, a DAG discovery request (e.g., DIO) message may be transmitted from the root device(s) of the DAG downward toward the leaves, informing each successive receiving device how to reach the root device (that is, from where the request is received is generally the direction of the root). Accordingly, a DAG may be created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining a routing state may aggregate routes from DAO messages that they receive before transmitting the DAO message. Nodes that are not capable of maintaining routing state, however, may attach a next-hop parent address. The DAO message can then be sent directly to the DODAG root that can in turn build the topology and locally compute downward routes to all nodes in the DODAG. Such nodes can be then reachable using source routing techniques over regions of the DAG that are incapable of storing downward routing state.

In one configuration, the categorization of a message as critical is determined by the sending node. For example, a processor at a power distribution center may generate a new tariff message that indicates that a new pricing level is going into effect. Because of the potential impact on costs, the tariff message may be deemed a mission critical message. The processor at the power distribution message may encode a parameter, for example, at layer 3 of the protocol stack, indicating that the message is mission critical. In another configuration, a message is identified as being critical as determined by the identity of the sender or the content of a message. For example, a node receiving a message from a neighbor related to a power outage may be analyzed by the node, which in turn processes the message as a mission critical message as a result of determining that the content of the message relates to a mission critical message. In another example, receiving a message identifier for a message includes receiving a message and calculating a signature for the message once the message has been received.

A number of implementations of the invention have been described. Nevertheless, it will be understood that various modifications may be made without departing from the spirit and scope of the disclosure. The disclosed implementations and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of transmitting a message in a Low-power and Lossy Network (LLN), the method comprising:

receiving, on a first node in the LLN, a message from a sending node;

determining if the message has already been received by the first node previously;
identifying the received message as a critical message;
in response to both identifying the message as a critical message and to determining that the message has not been received by the first node previously, identifying a first parent and a second parent of the first node to which the message is to be transmitted;
transmitting the message with a critical message indication from the first node to the identified first parent node;
receiving a negative acknowledgment message from the first parent node indicating that the message with the critical message indication has been received by the first parent node previously;
in response to receiving the negative acknowledgment message from the first parent node, transmitting the message with the critical message indication to the second parent node;
receiving a negative acknowledgment message from the second parent node indicating that the message with the critical message indication has been received by the second parent node previously;
in response to receiving the negative acknowledgment message from the second parent node, transmitting the message with the critical message indication to a third parent node,
wherein a path of transmission of the message through the LLN is not identified before the message is transmitted through the LLN, and
wherein an order of nodes used for transmission of the message through the LLN is determined dynamically as the message moves through the LLN;
receiving a negative acknowledge message from two or more siblings indicating that an uplink path is experiencing adverse performance;
in response to receiving the negative acknowledge message from two or more siblings:
  identifying two or more child nodes that are directly accessible from an intermediate node the two or more sibling nodes siblings of the intermediate node and the two or more child nodes children of the intermediate node;
  configuring the two or more child nodes to send the message using a different parent node; and
  transmitting message to the two or more child nodes for transmission to the different parent node.

2. The method of claim 1, the method further comprising storing the message identifier for some period of time in response to determining that the message has not already been received.

3. The method of claim 1, the method further comprising:
transmitting, in response to determining that the message has already been received, the message to the sending node indicating that the message has already been received.

4. The method of claim 1, the method further comprising in response to identifying the message as a critical message, activating a critical message notification in response to detecting a critical message indication for the message includes invoking a filter to reduce an amount of traffic that the node sends.

5. The method of claim 1, the method further comprising in response to identifying the message as a critical message, activating a critical message notification in response to detecting a critical message indication for the message includes transmitting only packets associated with the critical message indication using the critical message notification.

6. The method of claim 1, the method further comprising:
transmitting, using the first node, the message in parallel from the first node to each of the first parent and the second parent.

7. The method of claim 1, the method further comprising:
receiving a negative acknowledge message from more than one parent indicating that an uplink path is experiencing adverse performance;
identifying one or more sibling nodes that are directly accessible from an intermediate node, the one or more sibling nodes siblings of the intermediate node and the more than one parent parents of the intermediate node; and
forwarding the message to the one of the one or more sibling nodes.

8. The method of claim 1, the method further comprising:
generating a duplicate message and identifying, in response to activating the critical message notification, a third and a fourth parent of the first node to which to transmit the duplicate message;
transmitting the duplicate message with the critical message indication from the first node to the third parent node;
receiving a negative acknowledgement message from the third parent node indicating that the duplicate message with the critical message indication has been received by the third parent mode previously; and
in response to receiving the negative acknowledgement message from the third parent node:
transmitting the duplicate message with the critical message indication to the fourth parent node.

9. A system configured to transmit a message in a Low-power and Lossy Network (LLN), the system comprising a processor and instructions that when executed on a processor cause the processor to:
  receive, on a first node in the LLN, a message from a sending node;
  determine if the message has already been received by the first node previously;
  identify the received message as a critical message;
  in response to both identification of the message as a critical message and to determination that the message has not been received by the first node previously, identify a first parent and a second parent of the first node to which the message is to be transmitted;
  transmit the message with a critical message indication from the first node to the first parent node;
  receive a negative acknowledgment message from the first parent node indicating that the message with the critical message indication has been received by the first parent node previously;
  in response to receiving the negative acknowledgment message from the first parent node, transmit the message with the critical message indication to the second parent node;
  receive a negative acknowledgment message from the second parent node indicating that the message with the critical message indication has been received by the second parent node previously;
  in response to receiving the negative acknowledgment message from the second parent node, transmit the message with the critical message indication to a third parent node,
  wherein a path of transmission of the message through the LLN is not identified before the message is transmitted through the LLN, and wherein an order of nodes used for transmission of the message through the LLN is determined dynamically as the message moves through the LLN;

receive a negative acknowledgement message from two or more siblings indicating that an uplink path is experiencing adverse performance;

in response to receiving the negative acknowledgement message from the two or more siblings:
- identify two or more child nodes that are directly accessible from an intermediate node, the two or more sibling nodes siblings of the intermediate node and the two or more child nodes children of the intermediate node;
- configure the two or more child nodes to send the message using a different parent node; and
- transmit message to the two or more child nodes for transmission to the different parent node.

10. The system of claim 7, the system further comprising instructions that include storing the message identifier for some period of time in response to determining that the message has not already been received.

11. The system of claim 9, the system further comprising instructions that include:
   transmitting, in response to determining that the message has already been received, the message to the sending node indicating that the message has already been received.

12. The system of claim 9, the system further comprising instructions that in response to identifying the critical message, activate a critical message notification in response to detecting a critical message indication for the message includes invoking a filter to reduce an amount of traffic that the node sends.

13. The system of claim 9, the system further comprising instructions that in response to identifying the critical message, activate a critical message notification in response to detecting a critical message indication for the message includes transmitting only packets associated with the critical message indication using the critical message notification.

14. The system of claim 9, the system further comprising instructions that, using the first node, the message in parallel from the first node to each of the first parent and the second parent.

15. The system of claim 9, the system further comprising instructions that:
   receive a negative acknowledge message from more than one parent indicating that an uplink path is experiencing adverse performance;
   identify one or more sibling nodes that are directly accessible from an intermediate node, the one or more sibling nodes siblings of the intermediate node and the more than one parent parents of the intermediate node; and
   forward the message to the one of the sibling nodes.

16. The system of claim 9, the system further comprising instructions that:
   generate a duplicate message and identifying, in response to activating the critical message notification, a third and a fourth parent of the first node to which to transmit the duplicate message;
   transmit the duplicate message with the critical message indication from the first node to the third parent node;
   receive a negative acknowledgement message from the third parent node indicating that the duplicate message with the critical message indication has been received by the third parent mode previously; and
   in response to receiving the negative acknowledgement message from the third parent node:
      transmit the duplicate message with the critical message indication to the fourth parent node.

* * * * *